(12) United States Patent
Vincon et al.

(10) Patent No.: US 10,001,223 B2
(45) Date of Patent: Jun. 19, 2018

(54) ELECTROMAGNETIC VALVE DEVICE AND COIL FORMER

(71) Applicant: ETO Magnetic GmbH, Stockach (DE)

(72) Inventors: Peter Vincon, Stockach (DE); Stefan Bender, Engen (DE)

(73) Assignee: ETO Magnetic GmbH, Stockach (DE)

( * ) Notice: Subject to any disclaimer, the term of this patent is extended or adjusted under 35 U.S.C. 154(b) by 51 days.

(21) Appl. No.: 14/902,624

(22) PCT Filed: May 28, 2014

(86) PCT No.: PCT/EP2014/061183
§ 371 (c)(1),
(2) Date: Jan. 4, 2016

(87) PCT Pub. No.: WO2015/007425
PCT Pub. Date: Jan. 22, 2015

(65) Prior Publication Data
US 2016/0186879 A1    Jun. 30, 2016

(30) Foreign Application Priority Data
Jul. 19, 2013   (DE) .................. 10 2013 107 743

(51) Int. Cl.
*F16K 27/02*   (2006.01)
*F16K 31/06*   (2006.01)
*H01F 7/16*    (2006.01)

(52) U.S. Cl.
CPC ........ *F16K 27/029* (2013.01); *F16K 31/0693* (2013.01); *H01F 7/1607* (2013.01)

(58) Field of Classification Search
CPC ............... F16K 27/029; F16K 31/0693; F16K 31/0651; H01F 7/1607
See application file for complete search history.

(56) References Cited

U.S. PATENT DOCUMENTS

| 4,639,704 A | 1/1987 | Shand et al. |
| 5,606,992 A * | 3/1997 | Erickson ............ F16K 31/0665 137/596.17 |

(Continued)

FOREIGN PATENT DOCUMENTS

| CN | 1265185 A | 8/2000 |
| CN | 101311589 A | 11/2008 |

(Continued)

OTHER PUBLICATIONS

Extract of Chinese office action for Chinese patent application No. 2014800286505 dated Jul. 19, 2013.

(Continued)

*Primary Examiner* — Matthew W Jellett
(74) *Attorney, Agent, or Firm* — Bachman & LaPointe, PC

(57) ABSTRACT

An electromagnetic valve device with an armature unit (10) which is designed for carrying out an opening or closing operation of a fluid channel and, as a reaction to stationary coil means (18, 20, 22), which at least partially surround the armature unit, being energized, is driveable so as to be movable along an axial direction (12) relative thereto, wherein the coil means have a coil former (20) which forms a winding section (20) for a winding (22) to be energized, and the coil former forms an axially extending inner casing which is designed for guiding the armature unit and in the lateral surface of which slot- or groove-like channels (54) permitting drainage of an armature movement space are formed, wherein the coil former provides a channel outlet (56) for the channels (54) lying axially opposite an inlet- or respectively outlet section (24) of the fluid channel and on the end face, with which channel outlet blocking and/or deflection means against infiltrating intrusive media are associated.

13 Claims, 3 Drawing Sheets

(56) References Cited

U.S. PATENT DOCUMENTS

| | | | | |
|---|---|---|---|---|
| 5,897,098 A * | 4/1999 | Nishinosono | ....... | F16H 61/0251 251/129.08 |
| 5,915,416 A * | 6/1999 | Okazaki | .............. | F16K 31/0637 137/596.17 |
| 5,992,461 A * | 11/1999 | Gilmore | ................... | H01F 7/081 137/625.65 |
| 6,076,803 A * | 6/2000 | Johnson | .............. | F16K 31/0655 251/129.22 |
| 6,163,239 A | 12/2000 | Ozawa et al. | | |
| 6,220,275 B1 * | 4/2001 | Nishinosono | ....... | F16K 31/0606 137/238 |
| 6,651,953 B2 * | 11/2003 | Weldon | .............. | F02M 25/0836 123/516 |
| 6,792,975 B2 * | 9/2004 | Erickson | ............ | F16K 31/0613 137/625.27 |
| 9,423,045 B2 * | 8/2016 | Mills | ................... | F16H 61/0009 |
| 2006/0180782 A1 | 8/2006 | Moreno et al. | | |

FOREIGN PATENT DOCUMENTS

| | | |
|---|---|---|
| DE | 10 2005 036 404 | 5/2006 |
| DE | 10 2010 008 744 | 8/2011 |

OTHER PUBLICATIONS

International Apln. No. PCT/EP2014/061183 search report dated Sep. 10, 2014.

* cited by examiner

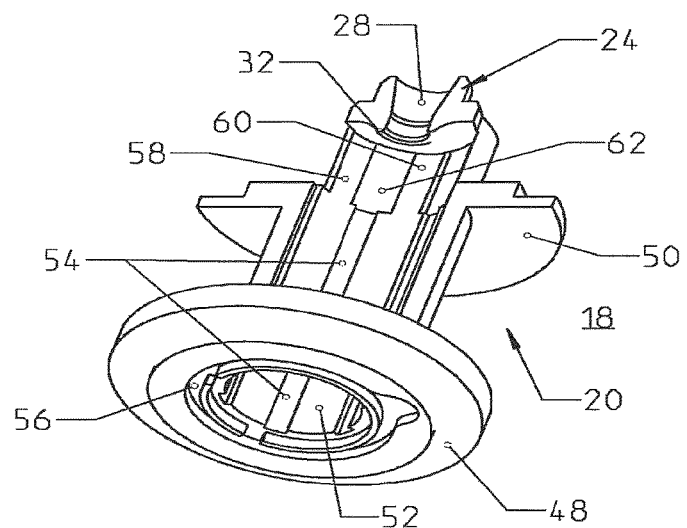
Fig. 3
Fig. 4
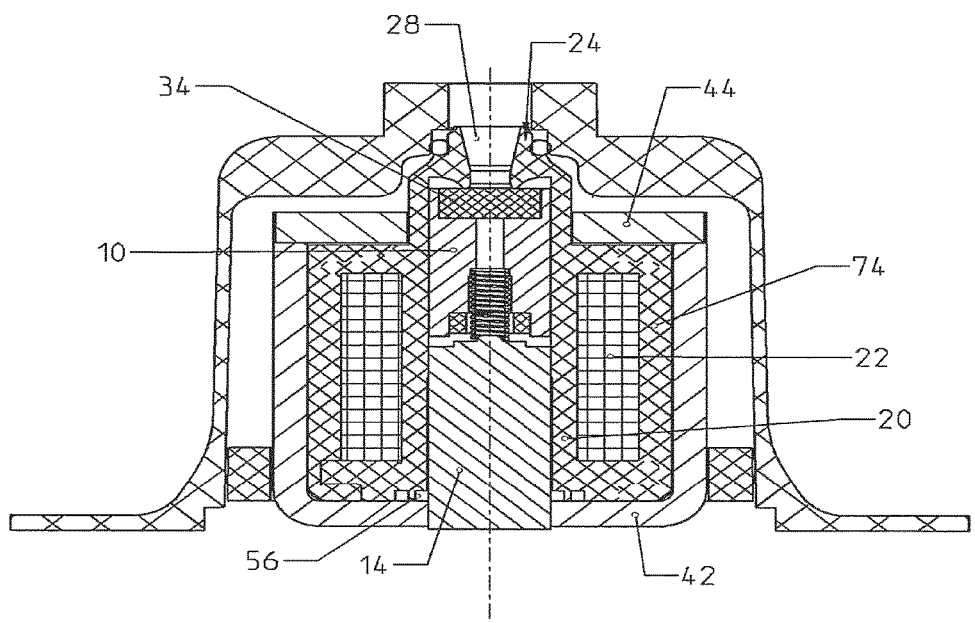

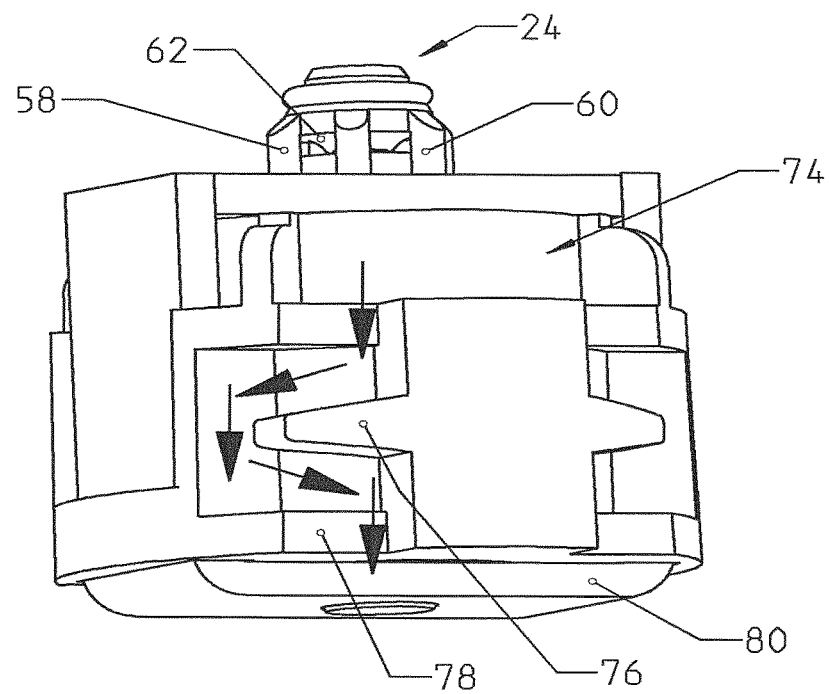
Fig. 5
Fig. 6
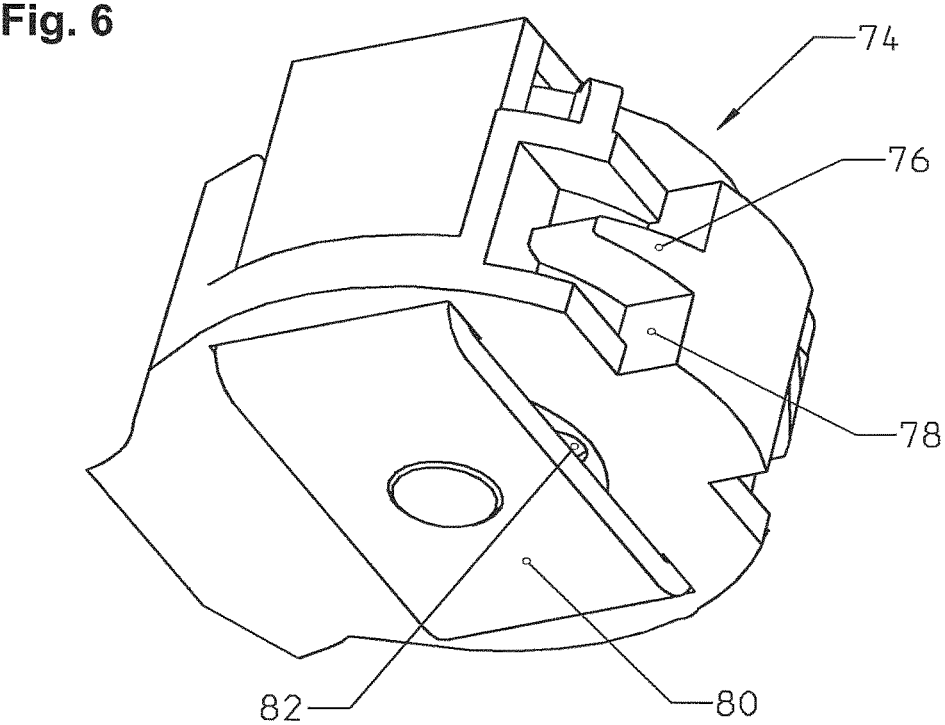

ELECTROMAGNETIC VALVE DEVICE AND COIL FORMER

BACKGROUND OF THE INVENTION

The present invention relates to an electromagnetic valve device. The invention further relates to a coil former for the realization of an electromagnetic adjustment device, in particular of a generic electromagnetic valve device.

From the prior art, it is generally known to assume to use electromagnetic actuators for valve control. In practical terms, such an electromagnetic actuator is realized from an armature unit which is movable relative to a stationary core- and a stationary coil unit as a reaction to the energizing of this coil unit, wherein typically such an electromagnetic adjustment device (also designated as actuator) is configured structurally so that the coil unit, realized from a coil former (typically constructed as a plastic injection part) with a winding provided thereof, to be energized in a suitable manner, surrounds the armature unit and thus forms in its free interior an armature movement space. The armature unit, accordingly movable along an axial longitudinal direction (which typically is likewise a symmetry axis of a radially symmetrical coil unit), typically has on the axial end side a closure section, formed as an elastomer pad, which in accordance with a respective axial armature position exposes a valve seat, aligned axially to the armature unit and typically stationary, of an electromagnetic valve known as being generic, and therefore opens or respectively closes it.

Such a technology, assumed as being known, is configured for the most varied of purposes of use and in particular is also able to be produced or respectively manufactured advantageously from the point of view of mass production.

Not least for these reasons the technology described above has also established itself in automobile or respectively motor vehicle applications and solves the most varied adjustment or respectively valve functions, thus for instance as a fluid valve for a motor vehicle air suspension.

However, the mobile use in fact places particular requirements on such electromagnetic valve devices. Thus, for instance, in the engine compartment, in the underneath region of the vehicle or in other exposed installation spaces, particular contamination situations occur, which leads to intrusive media, for instance water, dust particles or other substances penetrating in an undesired manner through valve outlets (for instance conventional ventilation or respectively drainage openings) into generic valve devices and thus leading to operational disturbances or respectively to even bringing about a potential reduction of service- or respectively operating times. At the same time, however, it is frequently not possible, for instance through structural reduction of the size of ventilation- or respectively drainage cross-sections, to prevent such an undesired penetration of foreign materials, because such measures not only have a disadvantageous effect on dynamic characteristics and hence on the operating behaviour of such valve devices, but also for instance in (conventional) multi-part systems, the mounting or respectively arrangement of ventilation- or respectively draining channels is then made difficult.

A further technical disadvantage of the technology described above, assumed as generic, lies in that with increasingly more compact arrangements (for instance due to installation spaces becoming smaller in an assembly context), an increasingly more precise alignment of the armature unit together with the closure element (i.e. for instance elastomer closure bodies) relative to the valve seat is necessary; in the case of small radial dimensions, otherwise already tolerances can lead to leakages and hence to malfunctions of valve devices realized in this way. This is in particular of concern in that in the case of devices known from the prior art, the valve seat or respectively an assembly realizing the valve seat on the one hand, and the armature unit together with surrounding coil infrastructure on the other hand are different assemblies, which if applicable are also subject additionally to different tolerance conditions or respectively environmental influences. Against this background and with the aim of it still being possible to realize compact (i.e. in particular minimized also in radial direction or respectively in diameter) electromagnetic valve devices of the generic type, it is therefore an object of the present invention to improve an electromagnetic valve device according to the introductory clause of the main claim with regard to optimized conditions for an adjustment or respectively mounting, at the same time to provide for an optimized closure in the cooperating between the armature unit or respectively its closure section and an associated valve seat, and additionally to provide passage- or respectively flow cross-sections which are as wide as possible both for the fluid which is to be operated with the valve device and also for any fluids which are to be provided and let out for a drainage. Additionally, the valve device which is to thus be improved is to be protected in an improved manner against the undesired penetration of intrusive media.

SUMMARY OF THE INVENTION

The problem is solved by the electromagnetic valve device with the features disclosed herein, and advantageous further developments of the invention are also described herein. Independent protection within the scope of the invention is claimed additionally for a coil former, which is suitable in particular for the realization of the electric valve device disclosed herein, furthermore, however, is also suitable for a plurality of further electromagnetic adjustment devices, in particular again with a particular focus on electromagnetic valves which are to be realized therewith. Within the scope of the present invention in addition the advantageous further developments described herein are also deemed likewise applicable for and further developing the coil former device according to the invention.

In an advantageous manner according to the invention, the present invention firstly permits the effective formation of channels serving for a drainage and/or a ventilation for instance of the armature interior: These channels are formed according to the invention in a further developing manner as slots or respectively grooves in a (preferably hollow cylindrical) inner casing of the winding section of the coil former, so that the coil former in this region, in addition to its guidance role for the (then likewise cylindrical) armature unit interrupts the lateral surfaces, thus cooperating with one another, circumferentially by the channels. Additionally in a further developing manner, these are guided axially on the end face (lying opposite the inlet- or respectively outlet section and hence the valve seat) via blocking- or respectively deflection means, for instance a material realized from the (plastic) material of the coil former, which in the manner according to the solution advantageously prevents, at least seriously impedes, the undesired entry of intrusive media into these channels also in an environment of use which is susceptible to contamination. Advantageously again the preferred configuration of the coil former as a plastic injection part provides for the possibility of implementing with the least effort these additional improvements with the least possible additional expenditure in terms of manufacture and assembly.

Again advantageously and in a further developing manner, the invention makes provision that fluid guide sections are provided preferably laterally adjacent to the coil former, which fluid guide sections in particular guide the fluid, flowing through the transition region, exposed in the case of an opening of the valve, between the inlet- or respectively outlet section and the winding section, laterally along the coil means, up to suitable outlets on the base side. Such fluid guide sections are realized according to the invention in a further developing manner in the form of plate-shaped assemblies, further preferably even as plastic injection moulded parts, wherein, again with the purpose of an impeded penetration of intrusive media, in this way deflection- or respectively meander means can be realized as sections of the fluid guide, by such elevations or respectively depressions being introduced into the plastic material by a further preferred plastic injection moulding method.

In an advantageous manner according to the invention, according to a further development additionally the inlet- and/or outlet section is associated with the winding section of the coil former, which inlet- and/or outlet section in particular enables from an axial direction from externally the entry or respectively exit of the fluid which is to be operated with the valve device and, lying opposite this entry or respectively exit, offers in the manner of a valve seat a closure partner for the closure section of the armature unit, so that in a manner according to the invention already through this integrated coil former an alignment of the armature unit (together with closure section) to the valve seat takes place. In other words, through the fact that according to the invention within the scope of the further development, both the guide of the armature unit (within the coil surrounding the latter, i.e. within the winding section) is integrated with the inlet or respectively outlet which is to be closed by the valve, both an installation of the valve device at a place of use, and also an adjustment or respectively arrangement of the valve function in cooperation between closure section and valve seat is drastically simplified.

This advantage according to the invention is then further improved in particular in that, further preferably by way of a plastic injection method or suchlike, the coil former is produced with its components "winding section" and "inlet or respectively outlet section" as a combined, one-piece part.

It has proved to be particularly advantageous structurally here to connect the two components with one another via web sections or suchlike connecting sections so that in the transition region between the inlet or respectively outlet section and the winding section wide flow cross-sections for fluid are produced, which then in an opening state of the valve (i.e. the closure section of the armature unit is situated at a distance from the inlet or respectively outlet section or respectively the valve seat formed therein) permits a low flow-resistance through-flow of the valve. The further preferred radially symmetrical configuration at least of this section of the coil former then leads to a cage shape in this transition region, which combines mechanical stability with the described favourable guide characteristics and an ability to be manufactured simply and in an automated manner.

Advantageously and in a further developing manner according to the invention, the inlet or respectively outlet section realizes a nozzle-like channel or respectively a channel widening in the direction of the axial end. In the widened opening region, the connection then takes place to the actual working chamber of the valve, i.e. the inflow or respectively outflow of the fluid entering into the valve, whilst at the narrowed end of the channel, lying axially opposite the widened region, a region serving as a valve seat is then constructed for cooperating with the closure section (e.g. valve rubber) of the armature unit.

In this way, in a surprisingly simple and elegant manner from the point of view of construction and manufacturing, an electromagnetic valve device is produced, which significantly overcomes the disadvantages known from the prior art and in particular creates an electromagnetic valve device which combines the best possible protection with respect to undesirably penetrating intrusive and foreign media with the best possible (ideal) compactness and passages which are optimized for an unimpeded fluid flow. It becomes clear that in particular in use in mass production and in the practical installation or respectively adjustment at the place of use, an electromagnetic valve device produced in such a manner represents a significant reduction in expenditure.

BRIEF DESCRIPTION OF THE DRAWINGS

Further advantages, features and details of the invention will emerge from the following description of preferred example embodiments and with the aid of the drawings; these show in FIG. 1 a longitudinal section through an electromagnetic valve device according to a first embodiment of the present invention in an energized opening state (i.e. the first example embodiment concerns a currentless-closed valve device);

FIG. 3 a partially cut off perspective view of the coil former according to the invention in accordance with the first example embodiment described in FIG. 1, FIG. 2 and as example embodiment of the coil former claimed independently as invention;

FIG. 4 a sectional view of the valve device of the first embodiment according to FIG. 1-3 from the perspective of FIG. 1 in the (currentless-) closed state; and FIG. 5, FIG. 6 perspective exterior views of the valve device of the first embodiment according to FIG. 1-4, to illustrate a fluid flow in the lateral casing region of the coil means (FIG. 5) or respectively to illustrate a drainage outlet in the (axial) base region of the coil means (FIG. 6).

DETAILED DESCRIPTION

Figure 1:
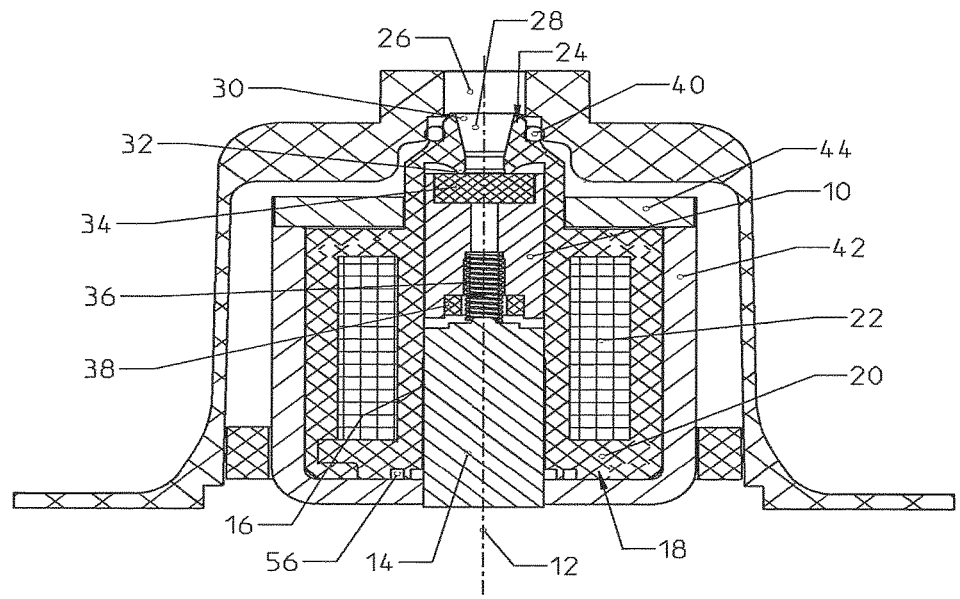

A magnetically soft armature unit 10, having a cylindrical outer casing, is movable along an axial direction (axis 12, likewise symmetry axis) relative to a stationary coil unit and a stationary core unit 14. The coil unit has here a coil body 18 providing a hollow cylindrical inner- or respectively guide space 16 for the armature unit, which has a winding section 20 and an (otherwise known) winding 22 (and which again, in an otherwise known manner, can be energized for driving the armature 10). An inlet- or respectively outlet section 24, which forms an opening 28 of a channel 30 which is widened in the direction of a valve working chamber 26, adjoins in one piece onto the winding section 20 axially on the end face of the coil former 18. This conical channel 30 forms at the other end (i.e. lying opposite the opening 28) a valve seat 32 tapering in the manner of a nozzle, which, along the axial direction 12, is aligned to the direction of movement of the armature unit 10. In practical terms, the armature 10 has in its end region directed to the valve seat 32 an inserted valve rubber section 34 as closure section, so that in the switching position of the valve device shown in FIG. 1, FIG. 2, the armature unit exposes the valve seat 32 and consequently the flow channel 28 of the inlet- or respectively outlet section, whilst, cf. in FIG. 4, the armature in its raised state of movement (corresponding to the non-energized state of the winding 22), the valve rubber 34 closes the valve seat 32 and thus seals the flow channel 28.

The armature unit 10 cooperates in an otherwise known manner electromagnetically with the core unit 14, wherein the spiral compression spring 36, provided in the armature interior and supported on an inner section and against the core 14, prestresses the armature unit and consequently the valve rubber into the closed position (FIG. 4). Annular polymer bodies 38 inserted into the armature unit 10 in the direction of the core unit 14 serve as damping of an armature impact with respect to the core unit 14 on energizing of the winding 22.

In the upper region (in the figures), the one-piece coil former 18 is supported and sealed by means of a ring seal 40 with respect to a surrounding installation housing infrastructure. In an otherwise known manner, a magnetically conducting housing consisting of a housing shell 42 and a face-side yoke plate 44 surrounds the coil body and thus provides for an electromagnetic flux via the armature unit or respectively the core, in order to drive the armature unit axially in the previously described manner.

In particular the perspective view of FIG. 3 illustrates further structural details of the coil former 18. Thus, firstly it becomes clear that the winding section 20 is delimited by a first ring flange 48 on the base side and by an upper ring flange 50, so that a winding region is produced for the winding 22. In the inner region 16, a hollow cylindrical lateral surface 52 is formed, which is adapted in a leading manner to an outer circumference of the armature body 10. Drainage channels 54, running parallel to the axial direction 12, are additionally shown, which are formed as axially-running slots into the plastic material of the one-piece coil former shown in FIG. 3, and open on the base side, in the region of the lower flange 38, into a labyrinth structure realized by means of projecting ring webs 56.

As explained in the introduction, this impedes the penetration of dirt or suchlike intrusive media into the interior of the armature chamber, which, likewise ventilated through the drainage channels 54, can be subjected to a drainage.

In the inlet- or respectively outlet section 24 of the coil former lying axially opposite ring flange 48, firstly in the perspective sectional view which is shown the flow channel 28, tapering conically to the valve seat 32, can be clearly seen. It becomes clear in addition that the section 24 is connected with the winding section 20 via webs 58, 60 running parallel to one another and axially parallel, wherein free spaces or respectively apertures occur, provided between these webs for the realization of flow passages 62. In the radially symmetrical configuration, see for instance FIG. 5, a cage structure is thus produced between the inlet- or respectively outlet section 24 and the winding section 20 which is linked by means of the webs 58, 60.

Figure 2:
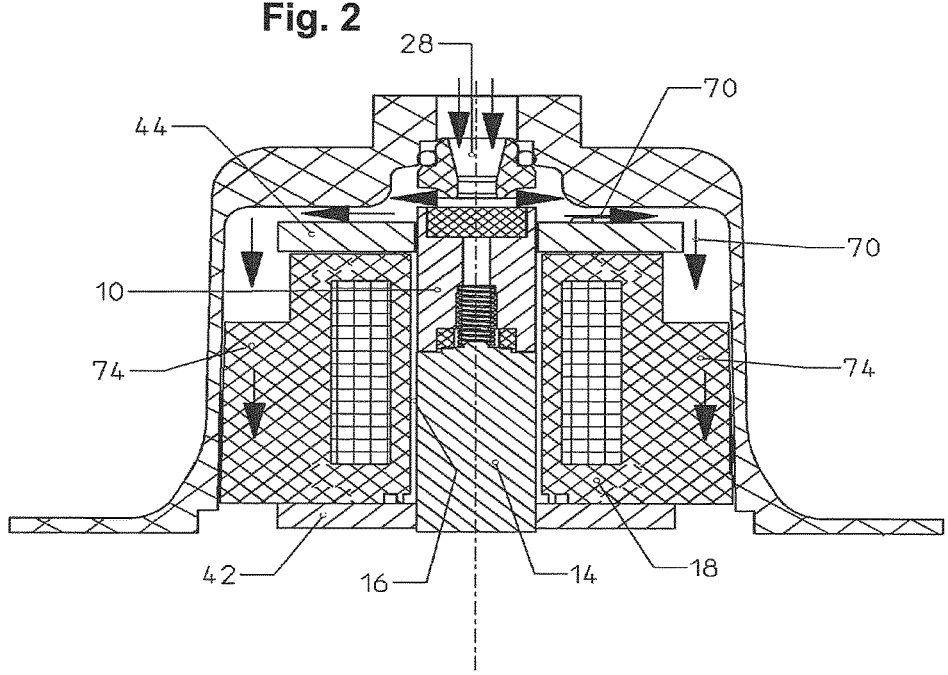
FIG. 2 a longitudinal sectional illustration of the first example embodiment analogous to FIG. 1 in opened valve state with fluid flows indicated diagrammatically by arrows.

The longitudinal sectional view of FIG. 2, rotated axially through 90° with respect to the illustration of FIG. 1, illustrates by the indicated arrows the fluid flow through the valve device in the opening state of the valve (i.e. axially lowered adjustment position of the armature unit 10 in vertical direction). It becomes clear that fluid flowing into the channel 28 in the opened state can firstly exit radially through the free opening sections 62 of the cage region and can then be guided again in vertical direction downwards (within a surrounding installation shell of the device). The illustration of FIG. 2 illustrates in addition the fluid assemblies 74 as fluid guide section, advantageously provided for this purpose, sitting laterally on the winding section, which fluid assemblies, cf. the perspective lateral illustration of FIG. 5 or respectively FIG. 6, are configured as plate-like injection moulded elements, in the manner shown in FIG. 5 require a meander-like fluid flow (due for instance to projections 76) and in the manner shown for instance in FIG. 1 can be fastened by applying or respectively gluing with the flanges 50, 48 of the winding section.

Again, this meander-like, labyrinth-like fluid guide leads to a penetration of undesired intrusive media (outlet region 78, shown in FIG. 5, 6) being at least made difficult.

With regard to the outlet on the base side (reference number 56 in FIG. 3), FIG. 6 additionally illustrates that in an assembly state a mounting plate 80, almost completely closing off the base, reduces the exit from the drainage device to the partial cross-section 82.

It becomes clear from the previously described example embodiment, which realizes a valve device in a typical realization with an armature stroke of approximately 1.1 mm, an armature diameter of 9 mm and an overall length of 40 mm in axial direction, that in addition to a distinctly improved protection from a penetration of foreign bodies or respectively foreign substances, especially the production, installation and adjustment are drastically simplified. This leads to a typical external diameter of the housing (FIG. 1 to FIG. 3) being able to be reduced to up to 30 mm, so that the present invention is suitable in particular for cramped installation spaces in burdened environments, hence has outstanding characteristics for instance for the mobile and motor vehicle field.

The invention claimed is:

1. An electromagnetic valve device with
    an armature unit (10) which is designed for carrying out an opening or closing operation of a fluid channel
    and, as a reaction to stationary coil means (18, 20, 22), which at least partially surround the armature unit, being energized, is driveable so as to be movable along an axial direction (12) relative thereto,
    wherein the coil means have a coil former (20) which forms a winding section (20) for a winding (22) to be energized, and
    the coil former forms an axially extending inner casing which is designed for guiding the armature unit and in a lateral surface of which slot- or groove-like channels (54) permitting drainage of an armature movement space are formed, wherein
    the coil former provides a channel outlet (56) for the channels (54) lying axially opposite an inlet- or respectively outlet section (24) of the fluid channel and on an end face, with which channel outlet blocking and/or deflection means against infiltrating intrusive media are associated, wherein fluid guide sections (74) are associated with the coil former for formation of a section of the fluid channel, which fluid guide sections are arranged radially outwards and have deflection and/or meander means (76) as plate-like projections to form an axially directed labyrinth flowpath, and wherein the fluid guide sections (74) are realized as an assembly connected on a casing side with the winding section, sitting laterally thereon.

2. The device according to claim 1, wherein the coil former forms the axially extending inner casing in a region of the winding section.

3. The device according to claim 1, wherein the coil former (18) forms at an axial end the inlet or respectively outlet section (24) of the fluid channel, which sits in one piece on the winding section (20) and is constructed so as to be able to be closed by a closure section (34) provided axially on the end face on or in the armature unit.

4. The device according to claim 1, wherein the channels run at least in sections axially parallel to the axial direction (12) and continue in a stationary core unit (14) provided coaxially and for magnetic cooperation with the armature unit on or in the coil former.

5. The device according to claim 1, wherein the assembly is a plastic injection part.

6. The device according to claim 1, wherein the coil former is realized as a one-piece injection part of a plastic material.

7. An electromagnetic valve device with
an armature unit (10) which is designed for carrying out an opening or closing operation of a fluid channel
and, as a reaction to stationary coil means (18, 20, 22), which at least partially surround the armature unit, being energized, is driveable so as to be movable along an axial direction (12) relative thereto,
wherein the coil means have a coil former (20) which forms a winding section (20) for a winding (22) to be energized, and
the coil former forms an axially extending inner casing which is designed for guiding the armature unit and in a lateral surface of which slot- or groove-like channels (54) permitting drainage of an armature movement space are formed, wherein
an inlet or respectively outlet section (24) of the fluid channel is connected via web sections (58, 60) in a cage-like manner with the winding section (20) so that a fluid flow can take place of fluid entering from axially outwards into the inlet or respectively outlet section, when a closure section (34) provided axially on an end face on or in the armature unit does not engage on the inlet or respectively outlet section, wherein fluid guide sections (74) are associated with the coil former for formation of a section of the fluid channel, which fluid guide sections are arranged radially outwards and have deflection and/or meander means (76) as plate-like projections to form an axially directed labyrinth flowpath, and wherein the fluid guide sections (74) are realized as an assembly connected on a casing side with the winding section, sitting laterally thereon.

8. The device according to claim 7, wherein the coil former forms the axially extending inner casing in the region of the winding section.

9. The device according to claim 7, wherein the inlet or respectively outlet section forms a channel (28) constructed in a nozzle-like manner and/or widening axially on the end face, which channel forms axially in the direction of the armature unit a closure seat (32) for cooperation with the closure section (34) of the armature unit.

10. The device according to claim 7, wherein the channels run at least in sections axially parallel to the axial direction (12) and continue in a stationary core unit (14) provided coaxially and for magnetic cooperation with the armature unit on or in the coil former.

11. The device according to claim 7, wherein the assembly is a plastic injection part.

12. The device according to claim 7, wherein the coil former is realized as a one-piece injection part of a plastic material.

13. A coil former for an electromagnetic adjustment device with a winding section (20), constructed for provision of a winding (22), extending along an axial direction (12) which forms an interior space (16) designed for guiding an armature unit (10) along the axial direction, wherein
the coil former has axially at one end an inlet and/or outlet section (24) sitting in one piece, so that an armature unit (10) guided in the interior space
in a closure position can close an axially internally-lying closure seat (32) of the inlet or respectively outlet section
and in an opening position, fluid flowing into the inlet or respectively outlet section can pass through an opening (62) or an aperture of the coil former between the inlet or respectively outlet section and the winding section, wherein fluid guide sections (74) are associated with the coil former for the formation of a section of the fluid channel, which fluid guide sections are arranged radially outwards and have deflection and/or meander means (76) as plate-like projections to form an axially directed labyrinth flowpath, and wherein the fluid guide sections (74) are realized as an assembly connected on a casing side with the winding section, sitting laterally thereon.

* * * * *